US008346643B2

(12) United States Patent
Boyer et al.

(10) Patent No.: US 8,346,643 B2
(45) Date of Patent: Jan. 1, 2013

(54) POINT OF SERVICE THIRD PARTY FINANCIAL MANAGEMENT VEHICLE FOR THE HEALTHCARE INDUSTRY

(75) Inventors: Dean F. Boyer, East Windsor, NJ (US); W. Edward Hammersla, III, Princeton Junction, NJ (US)

(73) Assignee: RealMed Corporation, Indianapolis, IN (US)

( * ) Notice: Subject to any disclaimer, the term of this patent is extended or adjusted under 35 U.S.C. 154(b) by 0 days.

(21) Appl. No.: 13/425,667

(22) Filed: Mar. 21, 2012

(65) Prior Publication Data
US 2012/0191485 A1 Jul. 26, 2012

Related U.S. Application Data

(62) Division of application No. 13/086,445, filed on Apr. 14, 2011, now Pat. No. 8,165,944, which is a division of application No. 09/690,940, filed on Oct. 18, 2000, now Pat. No. 7,949,580, which is a division of application No. 09/031,968, filed on Feb. 27, 1998, now Pat. No. 6,208,973.

(51) Int. Cl.
*G06Q 40/00* (2006.01)
(52) U.S. Cl. ............................................. 705/35; 705/40
(58) Field of Classification Search .................... 705/35, 705/40
See application file for complete search history.

(56) References Cited

U.S. PATENT DOCUMENTS

| | | | |
|---|---|---|---|
| 4,858,121 A | 8/1989 | Barber et al. | |
| 5,235,507 A | 8/1993 | Sackler et al. | |
| 5,301,105 A | 4/1994 | Cummings, Jr. | |
| 5,359,509 A | 10/1994 | Little et al. | |
| 5,583,760 A | 12/1996 | Klesse | |
| 5,644,778 A | 7/1997 | Burks et al. | |
| 5,704,044 A | 12/1997 | Tarter et al. | |
| 5,832,447 A | 11/1998 | Rieker et al. | |
| 5,930,759 A | 7/1999 | Moore et al. | |
| 6,195,612 B1 | 2/2001 | Pack-Harris | |
| 6,208,973 B1 | 3/2001 | Boyer et al. | |

FOREIGN PATENT DOCUMENTS
WO 91/15817 10/1991

OTHER PUBLICATIONS

Findlay, S., "A 'smart card' for medical bills?", USA Today, Dec. 10, 1997, Final Edition (Money), 1 pg.
PHI—Development Approach, Prospective Health, Inc. 1997, http://web.archive.org/web/19980101000000-19980228233939/http://www.Prospectivehealth.com.
PHI—Development Approach, Prospective Health, Inc. 1997, http://web.archive.org/web/19980116225426/www.Prospectivehealth.com.
PHI—Development Approach, Prospective Health, Inc., 1998, http://web.archive.org/web/19981201222559/www.Prospectivehealth.com.

(Continued)

*Primary Examiner* — Lindsay M. Maguire
(74) *Attorney, Agent, or Firm* — Ice Miller LLP

(57) ABSTRACT

A method for point of service third party adjudicated payment, which includes providing payment system access information to a point of service provider, receiving from the point of service provider purchase transaction data and the payment system access information, adjudicating the transaction substantially in real-time to determine the portion payable by the customer and the portion payable by a third party, sending an adjudicated settlement transaction to the point of service provider substantially in real-time, and initiating a request to transfer funds substantially in real-time in accordance with the adjudicated settlement transaction to an account of the service provider.

8 Claims, 13 Drawing Sheets

OTHER PUBLICATIONS

PHI ProANALYST, Prospective Health, Inc. 1997, http://web.archive.org/web/19960101000000-19980228235959/http://www.Prospectivehealth.com.

PHI ProINTERCEPT—Executive Summary, Prospective Health, Inc. 1997, http://web,archive.org/web/19980116225418/www.Prospectivehealth.com.

PHI ProINTERCEPT, Prospective Health, Inc., 1997, http://web.archive.org/web/19980116225254/www.Prospectivehealth.com.

Phi ProPBM—Executive Summary, Prospective Health, Inc. 1997, http://web.archive.org/web/19960101000000-19980228235959/http://www.Prospectivehealth.com.

Phi ProPBM—Executive Summary, Prospective Health, Inc., 1998, http://web.archive.org/web/199901281/0314/www.Prospectivehealth.com.

Phi ProPBM, Prospective Health, Inc., 1997, http://web.archive.org/web/19980116225301/www.Prospectivehealth.com.

PR Newswire. "Speedware, Prospective Health Inc., Announcing Reseller Agreement," New York: Jan. 20, 1998, p. 1, 2 pgs.

ProINTERCEPT—Overview, http://web.archive.org/web/19980116225438/www.Prospectivehealth.com.

ProPBM—Overview, Prospective Health, Inc., 1997, http://web.archive.org/web/19960101000000-19980228235959/http://www.Prospectivehealth.com.

ProPBM Functional Modules, Prospective Health, Inc., 1997, http://web.archive.org/web/19980116225500/www.Prospectivehealth.com.

ProPBM Functional Modules, Prospective Health, Inc., 1998, http://web.archive.org/web/19981205071328/www.Prospectivehealth.com.

RealMed launches local pilot in Indy, Indianapolis Business Journal, Oct. 12-18, 1998.

Welcome page for Prospective Health, Inc. website, Prospective Health, Inc., 1998, http://web.archive.org/web/19981206123833/http://www.Prospectivehealth.com.

"The City of the Golden Gate Sees a Golden Opportunity in Credit Cards," Credit Card News, Nov. 1997, 1 pg.

Schwanhausser, M., "The Future of Your Money," San Jose Mercury News, Jun. 1, 1997, 3 pages.

Gruber, W., "Co-brand credit cards catch on," Chicago Tribune, Jul. 2, 1997, 2 pages.

Hissy, P., (ed.), "Survey Says Cobranding Will Have to Change," Credit Card News, Nov. 1997, 1 page.

Berinato, S., "Cards to get smart in '98," PC Week, Dec. 22, 1997, 2 pages.

Anderson, R.E., "The Other Life of an ATM Card," The New York Times, Apr. 20, 1997, 139-141.

"Pension Fund Adds Online Benefits Transactions," Best's Review (Technology Notebook), Jan. 1997, 1 page.

Nylcare to Office Medical Savings Accounts; Company Well Position to Introduce New Product, Business Wire, Apr. 14, 1997, 1 pg., Order No. 603137.

Cobranded/Affinity Cards, Credit Card news, Nov. 15, 1997, 2 pages.

Healtheon: company Information, "About Healtheon." WWW, Sep. 1997, 2 pages.

Kazakoff, "Smart Card to Make Doctor Visits Easier," San Francisco Chronicle, Dec. 10, 1997, 1 pg., http://articles.sfgate.com/1997-12-10/business/17763497_1_realmed-smart-credit-card.

Processor Announces Healthy-Care Credit Card, Barton Crockett, American Banker, v157, n188, Sep. 29, 1992, 2 pages.

Integra Signs $37 Million Healthnet Contract: Becomes National Supplier of Terminals for Health Care Transaction Processing PR Newswire, Nov. 23, 1988, 2 pages.

"Two New Issuers Take a Stab at the Health-Care Market," Credit Card News, Oct. 1, 1997, 1 page.

Imperial Bank Retains Counterpart Capital Corporation to Help Expand its Health Care Divion, PR, http://www.thefreelibrary.com/Imperial Bank Retains Counterpart Capital Corporation to Help Expand . . .a019315211, Apr. 16, 1997, 2 pages.

O'Reilly, B., "Taking on the HMO's Minneapolis employers, in revolt, put health-care choices back in the hands of patents and doctors. Could this be a model for the U.S.?", Fortune, http://money.cnn.com/magazines/fortune/fortune_archive/1998/02/16/237698/index.htm, Feb. 16, 1998, 4 pages.

| ACCOUNT NUMBER | CREDIT LIMIT | AVAILABLE CREDIT | DEDUCTABLE DOLLARS | MEDICAL BALANCE | CASH ADV. BALANCE | STANDARD BALANCE | DAYS IN BILLING CYCLE | CYCLE START DATE | CYCLE END DATE | PAYMENT DUE DATE |
|---|---|---|---|---|---|---|---|---|---|---|
| 9943-0392-1582-4711 | 8000 | 901 | 83 | 2654 | 1045 | 3388 | 29 | 10/23/1997 | 11/20/1997 | 12/10/1997 |

| TRANS. DATE | POSTING DATE | REFERENCE NUMBER | DESCRIPTION OF ACTIVITY | AMOUNT |
|---|---|---|---|---|
| | | | MEDICAL TRANSACTIONS | |
| 24-Oct | 24-Oct | 1032 | KLEIN, EDWARD, MD  CLAIM 971024133546-680229 (SEE ATTACHED) | 640.00 |
| 24-Oct | 24-Oct | 1033 | CIGNA HEALTHCARE PAYMENT  CLAIM 971024133546-680229 (SEE ATTACHED) | (448.00) |
| 6-Nov | 6-Nov | 1034 | KLEIN, EDWARD, MD  CLAIM 971108036432-483064 (SEE ATTACHED) | 350.00 |
| 6-Nov | 6-Nov | 1035 | CIGNA HEALTHCARE PAYMENT  CLAIM 971108036432-483064 (SEE ATTACHED) | (256.00) |
| 8-Nov | 8-Nov | 1036 | DR. MORGENSTERN, DDS  CLAIM 971101493029-839434 (SEE ATTACHED) | 350.00 |
| 10-Nov | 10-Nov | 1037 | WANG, GEORGE, MD  CLAIM 971100948372-583943 (SEE ATTACHED) | 15.00 |
| 14-Nov | 14-Nov | 1038 | HIGHTSTOWN PEDIATRICS | 10.00 |
| 15-Nov | 15-Nov | 1039 | WINDSOR PODIATRY | 10.00 |
| | | | SUBTOTAL MEDICAL TRANSACTIONS | 671.00 |
| | | | STANDARD PURCHASES | |
| 5-Nov | 5-Nov | 1040 | FEDEX AB#501-620001663TN | 12.00 |
| 6-Nov | 6-Nov | 1041 | AT&T WORLDNET SERVICES | 19.96 |
| 6-Nov | 6-Nov | 1042 | BOYDS | 745.00 |
| 6-Nov | 6-Nov | 1043 | BEST BUY | 1016.96 |
| 10-Nov | 10-Nov | 1044 | HOME DEPOT | 237.54 |
| 10-Nov | 10-Nov | 1045 | AOL SERVICE 1197 | 19.94 |
| 11-Nov | 11-Nov | 1046 | STAPLES #140 | 173.40 |
| 14-Nov | 14-Nov | 1047 | PROGRAMMERS SUPER SHOP | 700.00 |
| 18-Nov | 18-Nov | 1048 | COMPAQ COMPUTERS | 297.24 |
| 19-Nov | 19-Nov | 1049 | SNEAKER STADIUM | 45.60 |
| | | | SUBTOTAL STANDARD PURCHASES | 3267.64 |

| ① | ② | ③ | | ④ |
|---|---|---|---|---|
| | | From Fig. 5A | | |
| 4-Nov | | CASH ADVANCES | | |
| 4-Nov | 1050 | MAC RT 571 & RT 130 | 300.00 | 300.00 |
| | | SUBTOTAL CASH ADVANCES | | 300.00 |
| | | ACCOUNT TRANSACTIONS | | |
| 20-Nov | 1051 | FINANCE CHARGE ON MEDICAL PURCHASES | | 22.43 |
| 20-Nov | 1052 | FINANCE CHARGE ON CASH ADVANCES | | 14.90 |
| 20-Nov | 1053 | FINANCE CHARGE ON STANDARD PURCHASES | | 69.90 |
| 20-Nov | 1054 | REFUND OF OVERCHARGE TRANS 0997 ON 9/12/97 | | (42.41) |
| | | SUBTOTAL ACCOUNT TRANSACTIONS | 64.82 | |
| | | PAYMENT(S) | | |
| 1-Nov | 1055 | PAYMENT THANK YOU | | (500.00) |
| 6-Nov | 1056 | PAYMENT THANK YOU | | (2000.00) |
| 12-Nov | 1057 | PAYMENT THANK YOU | | (1500.00) |
| 19-Nov | 1058 | PAYMENT THANK YOU | | (1000.00) |
| | | SUBTOTAL PAYMENT(S) | (5000.00) | |

| ACCOUNT SUMMARY | | |
|---|---|---|
| PREVIOUS BALANCE | | 7791.80 |
| MEDICAL PURCHASES | + | 1375.00 |
| CASH ADVANCES | + | 300.00 |
| STANDARD PURCHASES | + | 3267.64 |
| CREDITS | - | 42.41 |
| PAYMENTS | - | 5000.00 |
| LATE CHARGES | + | 0.00 |
| FINANCE CHARGES | + | 64.82 |
| NEW BALANCE | = | 7756.85 |

*Fig. 5B*

SUMMARY OF ACTIVITY

| INSURED | DATE | DESCRIPTION | OWED | PAID ON VISA | POSSIBLY DUE | QUICK PAY $ | NOTES |
|---|---|---|---|---|---|---|---|
| SAMANTHA SMITH (01) | 10/14/97 | KLEIN, EDWARD, MD | 112.00 | 640.00 | | | $80 OVERPAY |
| | 10/15/97 | PRINCETON MEDICAL CTR | 110.00 | 0.00 | 110.00 | 405 | |
| | 10/30/97 | KLEIN, EDWARD, MD | 64.00 | 350.00 | | | $30 OVERPAY |
| JOHN SMITH (02) | 10/14/97 | DR. MORGENSTERN, DDS | 350.00 | 350.00 | | | |
| | 10/29/97 | WANG, GEORGE, MD | 140.00 | 15.00 | 125.00 | 406 | |

EXPLANATION OF BENEFITS

| DATE OF SERVICE | DESCRIPTION OF SERVICE | AMOUNT BILLED | AMOUNT ALLOWED | YOUR RESPONSIBILITY | | | | | SEE NOTES | PAYMENT |
|---|---|---|---|---|---|---|---|---|---|---|
| | | | | DEDUCT-IBLE | CO-INS | CO-PAY | EXCLUDED EXPENSES | TOTAL | | |
| SAMANTHA SMITH (01) | | | | | | | | | | |
| CLAIM #971024133543-560229 | KLEIN, EDWARD, MD | | | | | | | | | |
| 10/24/97 | TELEPHONE CALL | 50.00 | 0.00 | 0.00 | 0.00 | 0.00 | 0.00 | 0.00 | 1084 | 0.00 |
| 10/24/97 | INITIAL CONSULT | 75.00 | 75.00 | 0.00 | 15.00 | 0.00 | 0.00 | 15.00 | 2047 | 60.00 |
| 10/24/97 | COLLECT VENOUS BLOOD | 30.00 | 0.00 | 0.00 | 0.00 | 0.00 | 0.00 | 0.00 | 1034 | 0.00 |
| 10/24/97 | PITUITARY GONADOTROP | 85.00 | 85.00 | 0.00 | 17.00 | 0.00 | 0.00 | 17.00 | 2047 | 68.00 |
| 10/24/97 | PITUITARY GONADOTROP | 85.00 | 85.00 | 0.00 | 17.00 | 0.00 | 0.00 | 17.00 | 2047 | 68.00 |
| 10/24/97 | RIA ASSAY OF ESTRADIOL | 70.00 | 70.00 | 0.00 | 14.00 | 0.00 | 0.00 | 14.00 | 2047 | 58.00 |
| 10/24/97 | ASSAY PROGESTERONE | 70.00 | 70.00 | 0.00 | 14.00 | 0.00 | 0.00 | 14.00 | 2047 | 58.00 |
| 10/24/97 | ECHOGRAPHY, TRANS | 175.00 | 175.00 | 0.00 | 35.00 | 0.00 | 0.00 | 35.00 | 2047 | 140.00 |
| CLAIM TOTAL | | 640.00 | 550.00 | 0.00 | 112.00 | 0.00 | 0.00 | 112.00 | | 448.00 |
| OHB VISA TRANSACTION 1032 ON 10/24/97 | PRINCETON MEDICAL CENTER | | | | | | | 640.00 | | |
| CLAIM #971025168543-938273 | | | | | | | | | | |
| 10/25/97 | OUT-PATIENT SERVICES | 1292.32 | 550.00 | 0.00 | 110.00 | 0.00 | 0.00 | 110.00 | | 440.00 |
| CLAIM TOTAL | | 1292.32 | 550.00 | 0.00 | 110.00 | 0.00 | 0.00 | 110.00 | | 440.00 |

| | | | | | | | | |
|---|---|---|---|---|---|---|---|---|
| CLAIM #97110603904432-483934 | KLEIN, EDWARD, MD | | | | | | | |
| 11/08/97 | OFFICE VISIT | 75.00 | 0.00 | 15.00 | 0.00 | 15.00 | 2047 | 60.00 |
| 11/08/97 | ECHOGRAPHY, TRANS | 175.00 | 0.00 | 35.00 | 0.00 | 35.00 | 2047 | 140.00 |
| 11/08/97 | ASSAY PROGESTERONE | 70.00 | 0.00 | 14.00 | 0.00 | 14.00 | 2047 | 56.00 |
| 11/08/97 | COLLECT VENOUS BLOOD | 30.00 | 0.00 | 0.00 | 0.00 | 0.00 | 1034 | 0.00 |
| CLAIM TOTAL | | 350.00 | 0.00 | 64.00 | 0.00 | 64.00 | | 256.00 |
| OHB VISA TRANSACTION 1033 ON 11/08/97 | | | | | 0.00 | 350.00 | | |
| SAMANTHA'S TOTAL | | 2282.82 | 1430.00 | 286.00 | 0.00 | 286.00 | | 1144.00 |
| JOHN SMITH (02) | | | | | | | | |
| CLAIM 97110149303293-839434 | DR. MORGENSTERN, DDS | | | | | | | |
| 11/01/97 | CROWN REPLACEMENT | 1500.00 | 500.00 | 250.00 | 0.00 | 100.00 | | 350.00 |
| CLAIM TOTAL | | 1500.00 | 500.00 | 250.00 | 0.00 | 100.00 | | 350.00 |
| WWW.ONEHEALTHBANK.COM INTERNET VISA TRANSACTION 1034 ON 11/05/97 | | | | | | | | |
| CLAIM 97111009483729-583943 | WANG, GEORGE, MD | | | | | | | |
| 11/10/97 | OFFICE VISIT | 80.00 | 75.00 | 0.00 | 15.00 | 0.00 | | 60.00 |
| 11/10/97 | RHYTHM ECG, TRACE | 125.00 | 125.00 | 0.00 | 0.00 | 125.00 | | 0.00 |
| CLAIM TOTAL | | 205.00 | 200.00 | 0.00 | 15.00 | 125.00 | | 60.00 |
| OHB VISA TRANSACTION 1035 ON 11/10/97 | | | | | 15.00 | 15.00 | | |
| JOHN'S TOTAL | | 1705.00 | 700.00 | 250.00 | 15.00 | 125.00 | | 210.00 |
| FAMILY TOTAL | | 3987.82 | 2130.00 | 386.00 | 15.00 | 776.00 | | 1354.00 |

From Fig. 6A

Fig. 6B

Healthcare Provider Name  
and Address

Third Party  
Payor Name

| Name | Swati Lele |
|---|---|
| Date | 2/10/1998 |
| Card Number | 4332-3011-3020-001 |
| Expiration Date | 6/99 |
| Authorization Code | 234556 |

| Transaction Date | Posting Date | CPT Code | CPT Description | Amount |
|---|---|---|---|---|
| 02/10/1998 | 02/10/1998 | 09142 | Consultation | 500 |

| Description | Amount |
|---|---|
| Services Rendered Charges | 500 |
| Lab Charges | 100 |
| Copay Charges | 20 |
| Total Charges | 620 |
| Amount paid by patient | 20 |
| Amount paid by insurer | 600 |
| Net Charges | 0 |

44 — Amount paid by patient  
46 — Amount paid by insurer

Authorized Signature X _____

Fig. 7

POINT OF SERVICE THIRD PARTY FINANCIAL MANAGEMENT VEHICLE FOR THE HEALTHCARE INDUSTRY

PRIORITY

The present patent application is related to, claims the priority benefit of, and is a U.S. Divisional Patent Application, of U.S. Nonprovisional patent application Ser. No. 13/086,445, filed Apr. 14, 2011 now U.S. Pat. No. 8,165,944, which is related to, and claims the priority benefit of, U.S. Divisional patent application Ser. No. 09/690,940, filed Oct. 18, 2000 and issued as U.S. Pat. No. 7,949,580 with an issue date of May 24, 2011, and claims the priority benefit of, U.S. Nonprovisional patent application Ser. No. 09/031,968, filed Feb. 27, 1998 and issued as U.S. Pat. No. 6,208,973, the entire contents of which are hereby incorporated by reference in their entirety into this disclosure.

FIELD OF THE INVENTION

This invention relates to a system and method for providing adjudicated third party payment at the point of service, and more particularly, to a system and method for determining at the point of service the portion of a service or product which is to be paid by a third party payor, such as a health insurance company, and the portion of the service or product which is to be paid by the customer (patient) and for providing payment settlement at the point of service.

BACKGROUND OF THE INVENTION

The costs of administering the third party payment system used in the healthcare industry are astronomical. It has been estimated that as much as 250 of healthcare costs are administrative costs, as opposed to clinical costs. This is due, in large part, to the difficulty in obtaining timely and efficient collection of payment from patients and third party payors (e.g., insurance companies). Conventionally, in only about 40% of patient visits can the amount of the patient payment be determined while the patient is in the healthcare provider's office, while approximately 60% of the time the patient payment amount can be determined only after the healthcare provider sends a claim to the third party payor and the third party payor adjudicates the claim, which typically delays the collection process by at least 4-6 weeks. When the patient payment amount can be determined at the time of service, payment cards, such as credit cards, debit cards, and the like, have been used to collect these payments. However, those claims requiring adjudication, i.e., where the healthcare provider cannot determine the patient payment amount at the time of service, healthcare providers have traditionally billed the patients on 30-day payment terms after sending a claim to the insurance company. Due to inefficiencies, it has been estimated by industry sources that the billing and collection costs for a single copayment is $10-$15 and that the average collection time is 45 days.

In conventional automated third party payor systems in the healthcare industry, the claim for payment is generated by the administrative staff of the healthcare provider or healthcare maintenance organization and transmitted electronically to a clearinghouse that accepts the electronic transmission, edits and processes the transmission, and reroutes and sends them electronically to the appropriate third party payors. In the health insurance industry, intermediaries receive claims from healthcare providers or other claimants, edit the claims data for validity and accuracy, translate the data from a given format into one acceptable to the intended third party payor (e.g., insurance company), and forward the processed claim to the appropriate third party payor. The third party payor then adjudicates the claim and makes payment/reimbursement at a time, as noted above, which is typically weeks after the service was rendered. As used herein, adjudication is the steps through which a claim for payment is processed by the third party payor to verify coverage eligibility, to determine the appropriateness of the care and services rendered, and to establish the amount of reimbursement. Prior art adjudication ranges from fully automated to partially automated to fully manual. However, the adjudication is typically performed by the third party payor during processing of the claim well after the service has been rendered. Of course, disputes regarding reimbursable services extend the payment period and increase the anxiety of the consumers and providers of healthcare products and services.

To date, the emphasis of automation in the healthcare industry has been in streamlining the claim submission and adjudication process and in streamlining the payment process for the portion of the payment which can be determined at the time of service. Unfortunately, previous efforts at applying automation to such an inefficient process have produced only small, incremental cost savings.

For example, health insurance management system such as that described by Sackler et al. in U.S. Pat. No. 5,235,507 processes health insurance claims for self-insurers using a computer program. The program is used by a health insurance administrator or management company to automatically process health insurance claims even where the claims fall under different insurance policies. While the disclosed program facilitates the operations of the health insurance administrator or management company, it does nothing to improve the payment efficiencies at the point of service.

Cummings, Jr. describes in U.S. Pat. No. 5,301,105 a healthcare management system that integrates the patient, the healthcare provider, bank or other financial institution, insurance company, utilization reviewer, and employer to provide comprehensive pre-treatment, treatment, and posttreatment healthcare and the required financial support. The system purportedly allows for total health management which takes into account the patient's available cash balances, insurance coverage, and the like in administering the patient's wellness. A terminal at the physician's office accepts data entry through conventional credit cards as well as special "smart" cards. However, no technique for providing adjudicated third party payment at the point of service is described.

Recently, payment cards, such as VISA® cards, have become widely used to facilitate the payment process for readily ascertainable amounts such as copayments at the point of service in all segments of the healthcare market, including hospitals, medical group practices, and dentists. Healthcare providers' needs for faster, more efficient collections, consumers' rising healthcare expenditures, and the increasing costs of healthcare have led to the increased use of such payment cards for such readily ascertainable amounts. As described in U.S. Pat. No. 5,583,760, private payment cards also have been issued to patients so that the patients can pay for medical services at participating providers; however, payment cards have not previously been used as the vehicle to access an adjudicated third party payment system for providing adjudicated settlement of healthcare claims at the point of service. This is the ultimate "streamlining" of the third party payment process and is the objective of the present invention.

To date, VISA® has used the Patient Easy Pay Consent form and a point-of-sale terminal to streamline payment by patients using a VISA® card for those amounts that could not be determined at the time of service. In that system, the healthcare providers swipe the patient's VISA® card at the terminal to capture the card information and the patient signs a receipt produced by the terminal to authorize the healthcare provider to charge the balance due for the patient's copayments, deductibles, and balances not covered by insurance to the patient's VISA® card account. The terminal then sends the Patient Easy Pay Consent information to the healthcare provider's computer for retrieval after adjudication. A conventional electronic payment authorization is launched after adjudication. However, claims processing and adjudication are performed in the conventional manner, thus causing a substantial delay in settling the balances due.

An adjudicated third party payment system is desired which eliminates the delay in claims processing and the associated administrative costs so that a healthcare consumer can settle payment at the point of service much as a consumer settles a hotel bill at checkout. The present invention has been designed to meet this great need in the art.

SUMMARY OF THE INVENTION

The present invention addresses the above-mentioned needs in the art by providing a point of service third party adjudicated payment system and method which provides for the creation of an adjudicated settlement transaction at a point of service which designates the portion of the service to be paid by the third party payor and the portion to be paid by the customer. In accordance with the invention, such a system comprises a point of service terminal which accepts a payment system access card, such as a credit card, debit card, or purchase card, for payment for a purchase of a service and/or product by a customer, where at least part of the purchase is reimbursable by a third party payor. In accordance with the invention, the point of service terminal creates a purchase transaction which is adjudicated by an adjudication engine substantially in real-time (at the time of service or in a purchase transaction processing batch) to determine a first portion of the purchase which is to be paid by the third party payor and a second portion of the purchase which is to be paid by the customer. An adjudicated settlement transaction is then returned to the point of service terminal designating at least the first portion and the second portion for payment. The payment system access card provides access to a payment system which transfers funds in accordance with the adjudicated settlement transaction whereby the third party payor is debited by the first portion and the point of service provider is paid the first portion and a payment account accessible by the payment system access card is charged at least the second portion and the point of service provider is paid the second portion as with typical payment card transactions.

In a preferred embodiment of the invention, the adjudication engine is connected to a node on the Internet and the point of service terminal accesses the adjudication engine via an Internet connection to the node. The adjudication engine itself preferably includes a data driven rules engine which processes data from the customer, the service provider, the third party payor, and the payment system to determine the first portion of the payment to be paid by the third party payor. Preferably, the purchase transaction includes a product and/or a service code which the adjudication engine compares to payment parameters and conditions from the third party payor to determine the value of the first portion of the purchase to be paid by the third party payor. In a preferred healthcare implementation of the invention, the point of service provider is a healthcare provider and the payment parameters and conditions are determined by a healthcare policy between the customer's employer and the third party payor.

In the preferred embodiment of the invention, the payment system includes a credit card network, and the adjudicated settlement transaction is formatted as a credit card transaction for processing by the credit card network. Preferably, the payment system access card is cobranded so as to include an account number for the credit card network and, in the preferred healthcare implementation, for the healthcare policy as well.

The corresponding method of providing third party adjudicated payment at a point of service in accordance with the invention preferably comprises the steps of:

providing a payment system access card, such as a credit card, debit card, or purchase card, to a point of service provider for payment for a purchase of a service and/or product by a customer, at least part of the purchase being reimbursable by a third party payor;

transmitting a purchase transaction to an adjudication engine for processing;

the adjudication engine adjudicating the purchase transaction substantially in real-time so as to determine a first portion of the purchase which is to be paid by the third party payor and a second portion of the purchase which is to be paid by the customer;

the adjudication engine returning an adjudicated settlement transaction to the point of service designating at least the first portion and the second portion; and transferring funds in accordance with the adjudicated settlement transaction whereby the third party payor is debited by the first portion and the point of service provider is paid the first portion and a payment account accessible by the payment system access card is charged at least the second portion and the point of service provider is paid the second portion.

In the preferred embodiment of the method, the step of transferring funds comprises the steps of charging the payment account by the first and second portions and crediting the payment account by the first portion upon adjudication. Alternatively, the funds transferring step may comprise the steps of debiting the third party payer by the first portion, paying the point of service provider the first portion, charging the payment account by at least the second portion, and paying the point of service provider the second portion. The funds transferring step preferably also comprises the steps of formatting the adjudicated settlement transaction as a credit card transaction and processing the adjudicated settlement transaction in a credit card network.

Preferably, the adjudicating step comprises the step of comparing product and/or service codes in the purchase transaction to payment parameters and conditions from the third party payor to determine the value of the first portion of the purchase to be paid by the third party payor. In a preferred healthcare implementation, the payment system access card is provided to the healthcare provider in the providing step prior to provision of healthcare services, and the method comprises the additional step of accessing the adjudication engine to verify patient eligibility for payment for services by the third party payer prior to provision of healthcare services by the healthcare provider. This feature of the invention allows the doctor and patient to consider costs when determining the course of a treatment. A coverage profile for the patient may also be provided to the healthcare provider for comparison with a preliminary diagnosis for healthcare services to be provided to the patient prior to providing healthcare services to the patient.

In accordance with another aspect of the invention, a method of converting a healthcare transaction into a credit card transaction for payment by a patient is provided. Such a method in accordance with the invention preferably comprises the steps of:

transmitting at least one of healthcare product and service codes for healthcare products and services purchased by the patient from a healthcare provider at a point of service to an adjudication engine for processing;

the adjudication engine adjudicating the product and service codes substantially in real-time so as to determine a first portion of the purchased healthcare products and services which is to be paid by a third party payor and a second portion of the purchased healthcare services which is to be paid by the patient;

the adjudication engine returning an adjudicated settlement transaction to the point of service designating at least the first portion and the second portion;

formatting the adjudicated settlement transaction as a credit card transaction at the point of service; and processing the formatted adjudicated settlement transaction in a credit card network for payment.

BRIEF DESCRIPTION OF THE DRAWINGS

The foregoing and other novel features and advantages of the invention will become more apparent and more readily appreciated by those skilled in the art after consideration of the following description in conjunction with the associated drawings, of which:

FIGS. 5A-B illustrate a credit card statement for a cobranded healthcare/credit card account used to access the payment system of the invention.

FIGS. 6A-B illustrate an explanation of benefits (EOB) statement corresponding to the credit card statement of FIGS. 5A-B.

FIG. 7 illustrates a sample adjudicated healthcare settlement transaction generated by the payment system of the invention for a simple healthcare transaction.

DETAILED DESCRIPTION OF THE PRESENTLY PREFERRED EMBODIMENTS

A preferred embodiment of the invention will now be described in detail with reference to FIGS. 1-8. Those skilled in the art will appreciate that the description given herein with respect to those figures is for exemplary purposes only and is not intended in any way to limit the scope of the invention. All questions regarding the scope of the invention may be resolved by referring to the appended claims.

As noted above, the term "adjudication" as used herein is the process through which a claim for payment is processed by the third party payor to verify coverage eligibility, to determine the appropriateness of the care and services rendered, and to establish the amount of reimbursement. As will be more apparent from the following detailed description, the invention provides a method for adjudicating a claim substantially in real-time by providing immediate access by the point of service provider to an adjudication engine specially developed to handle claims of the type generated by that point of service provider for reimbursement by a third party payor. While it is desired that the adjudication take place virtually instantaneously so that payment may be completely settled at the point of service at the time of service, "real-time" as used herein is also intended to permit "batch" processing and settlement of the claims processed by the service provider. For example, a healthcare administrative office may settle all of its claims for a given day overnight by batch processing the adjudicated settlement transactions received that day. In such a case, the adjudicated settlement transactions submitted that day may not actually be paid for a day or two. Similar techniques are used by hotels and airlines and are contemplated within the scope of the invention. Also, as used herein, an "adjudicated settlement transaction" is a statement or invoice provided at the point of service which specifies how much the third party payor will pay on a given claim and how much is the responsibility of the customer (e.g., the insured patient).

Figure 1:
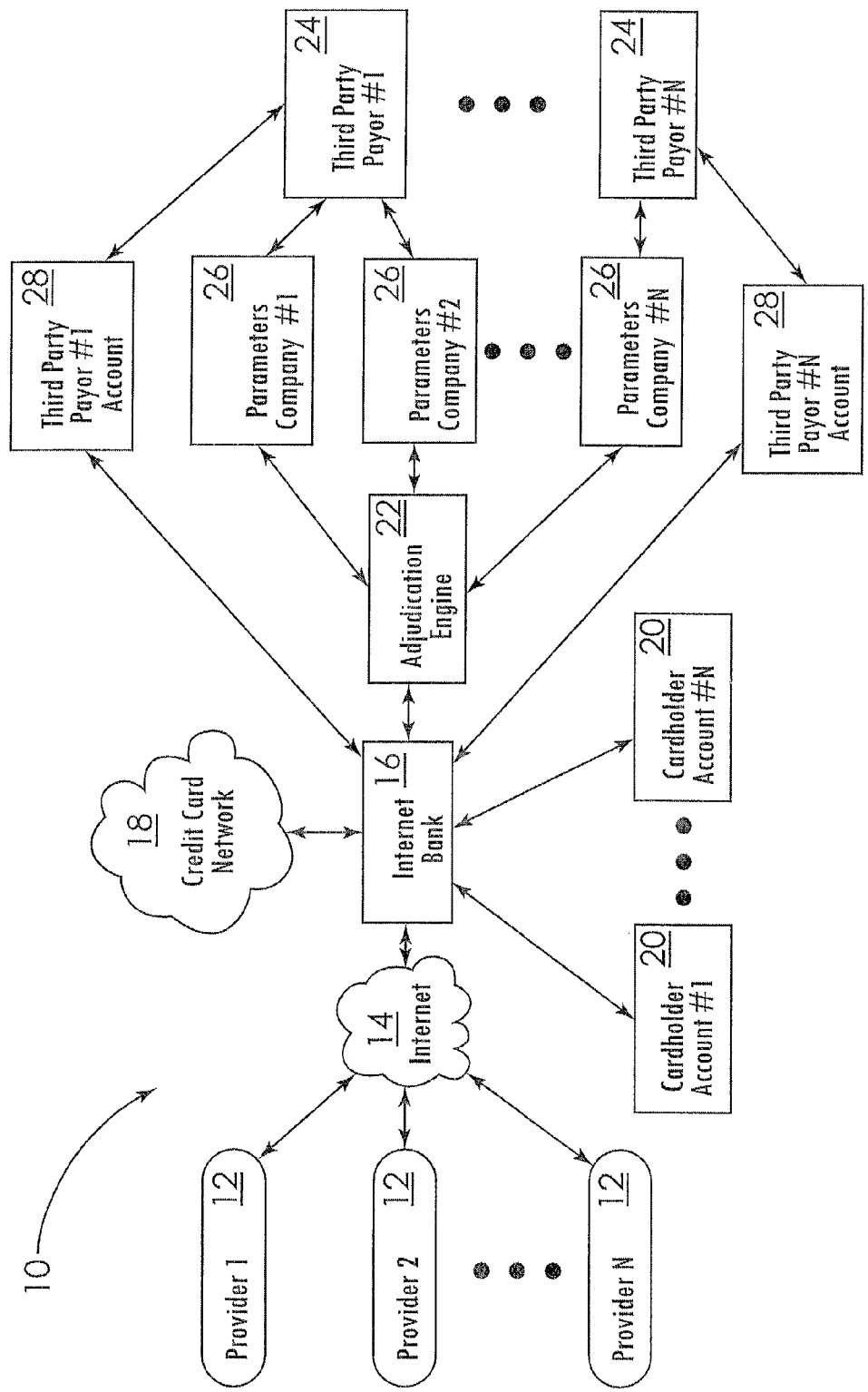
FIG. 1 illustrates a point of service third party adjudicated payment system in accordance with a currently preferred embodiment of the invention.

FIG. 1 illustrates a point of service third party adjudicated payment system 10 in accordance with a currently preferred embodiment of the invention. Although described in the preferred context of the payment of healthcare claims by an insurance company or other healthcare administrator, those skilled in the art will appreciate that the system and method of the invention may be used in all types of transactions involving resolution of payment by two or more parties obligated contractually or otherwise to apportion payment for received products and services.

As illustrated in FIG. 1, the system 10 of the invention is accessed by a plurality of product/service providers 12, such as doctor's offices, hospitals, pharmacies, and the like, who provide services and products such as physician care, hospital care, dental care, pharmaceutical products, lab tests, prosthetics, surgical equipment, and the like. In accordance with the invention, each such provider 12 has a point of service terminal which accepts a payment system access card, such as a credit card, debit card, or purchase card, for payment for a purchase of a service and/or product by a customer. As will be explained in more detail below, the result of a patient's interaction with the healthcare provider 12 is a healthcare transaction (HCT) which generally includes a claim for payment by the third party payor. As will also be explained below, each patient has access to an account which is tied to the cardholder, which may be the patient or a member of his or her family.

The payment system access card in accordance with the preferred healthcare embodiment of the invention is preferably a cobranded VISA® card, although other types of payment cards such as Mastercard®, Novis, Diner's Club, and Federal Reserve may, of course, be used. The "cobranding" partner in such an embodiment is the third party payor, which may include, by way of example, insurance companies, HCFA (Medicare), State Agencies (Medicaid), and self insured groups (HMOs). Typically, the third party payor contracts with the patient or the patient's employer or some other organization or association to which the patient belongs to provide payment through an administrator for services rendered by the healthcare provider. The third party payor also contracts with groups of Healthcare Provider Networks (HCPs) to fix prices on a per patient or per procedure basis. Preferably, the cobranded payment system access card is distributed to the insured through the insured's employer in place of the conventional healthcare ID cards. The cobranded card typically includes the information provided on the payment system access card as well as the healthcare ID card, although the amount of printed data may require that some of the information be printed on a sleeve for the payment system access card. Preferably, the account number for the payment system account and the healthcare account are the same to avoid confusion. The adjudicated third party payment system of the invention is accessed by swiping the card or entering the card number at a point of service terminal in the offices of the healthcare provider 12.

The cobranded payment card preferably carries two balances, one for standard transactions (retail, travel, entertainment, etc.), and one for healthcare purchases (doctors, hospitals, pharmacies, optical, dental, etc.). Generally, the healthcare balance carries a favorable interest rate. Also, all purchases, regardless of type, preferably generate "Deductible Dollars™" (cash back that is applied to the patient's out-of-pocket healthcare balance) at the rate of, e.g., one percent, which allows the cardholder to effectively eliminate his or her out-of-pocket expenses.

In the preferred implementation of the invention, the point of service terminal includes an Internet connection 14 to a node containing an Internet merchant bank 16 which is to process the credit card transaction via a credit card network 18 in the conventional manner. As illustrated, the Internet bank 16 operates as a conventional merchant bank for credit card processing by providing access to the credit card network 18 for processing of credit card transactions and also operates as a credit card issuing bank by providing cardholder accounts 20 used to facilitate credit card payment by the cardholder, keep track of balances and interest, and the like. However, in accordance with the invention, the Internet bank 16 further includes a direct connection to an adjudication engine 22 which, for example, takes a healthcare transaction (HCT) from the healthcare provider 12 and the patient, determines (adjudicates) the amount of the submitted claim which is to be paid by a third party payor 24, and creates an Adjudicated Settlement Transaction (AST) which pays the healthcare provider 12, bills the third party payor 24, and bills the patient. In the preferred embodiment, the Internet bank 16 has a web page which provides secure access to the adjudication engine 22 as a selection option for one accessing the Internet bank's web site, such as an administrator of the service provider 12. As will be explained in more detail below, the adjudication engine 22 processes, substantially in real-time, the claim from the service provider in accordance with parameters and conditions from the third party payor 24 to determine the portion of the claim to be paid by the third party payor 24. The "adjudicated" amount is then returned to the service provider 12 via the Internet connection 14 as an Adjudicated Settlement Transaction ready for payment. Since the Adjudicated Settlement Transaction specifies the amount the third party payor 24 will pay, the remaining balance in the claim, if any, may be charged directly to the customer's payment system access card for processing and payment via credit card network 18 in the conventional fashion. As when settling with a hotel at checkout, the service provider 12 has payment settled by the customer before he or she leaves the office. Also, the service provider 12 will know right away how much the third party payor 24 is obligated to pay towards the service provided.

Typically, a separate adjudication engine 22 is provided for each third party payor 24 and/or each company or organization through which the third party payment policy or contract is administered. In the healthcare context, for example, the appropriate parameters and conditions data 26 for the policy or policies of the company or organization through which the patient is insured are loaded into adjudication engine 22 upon submission of a claim for adjudication. As shown, a single third party payor 24 provides the different parameters and conditions 26 for the respective policies it issues to different companies so that the proper payment parameters and conditions for the policy elected by the employees of the respective companies are loaded into the adjudication engine 22 when a claim for a particular insured employee is received by the adjudication engine 22.

Finally, third party payor accounts 28 are provided which are administered by the third party payor 24 and/or the Internet bank 16 for facilitating the transfer of funds for the portions of the claims the third party payor 24 is obligated to pay. Internet bank 16 handles the transfer of these monies to the appropriate service provider 12 in a timely fashion.

Figure 2A:
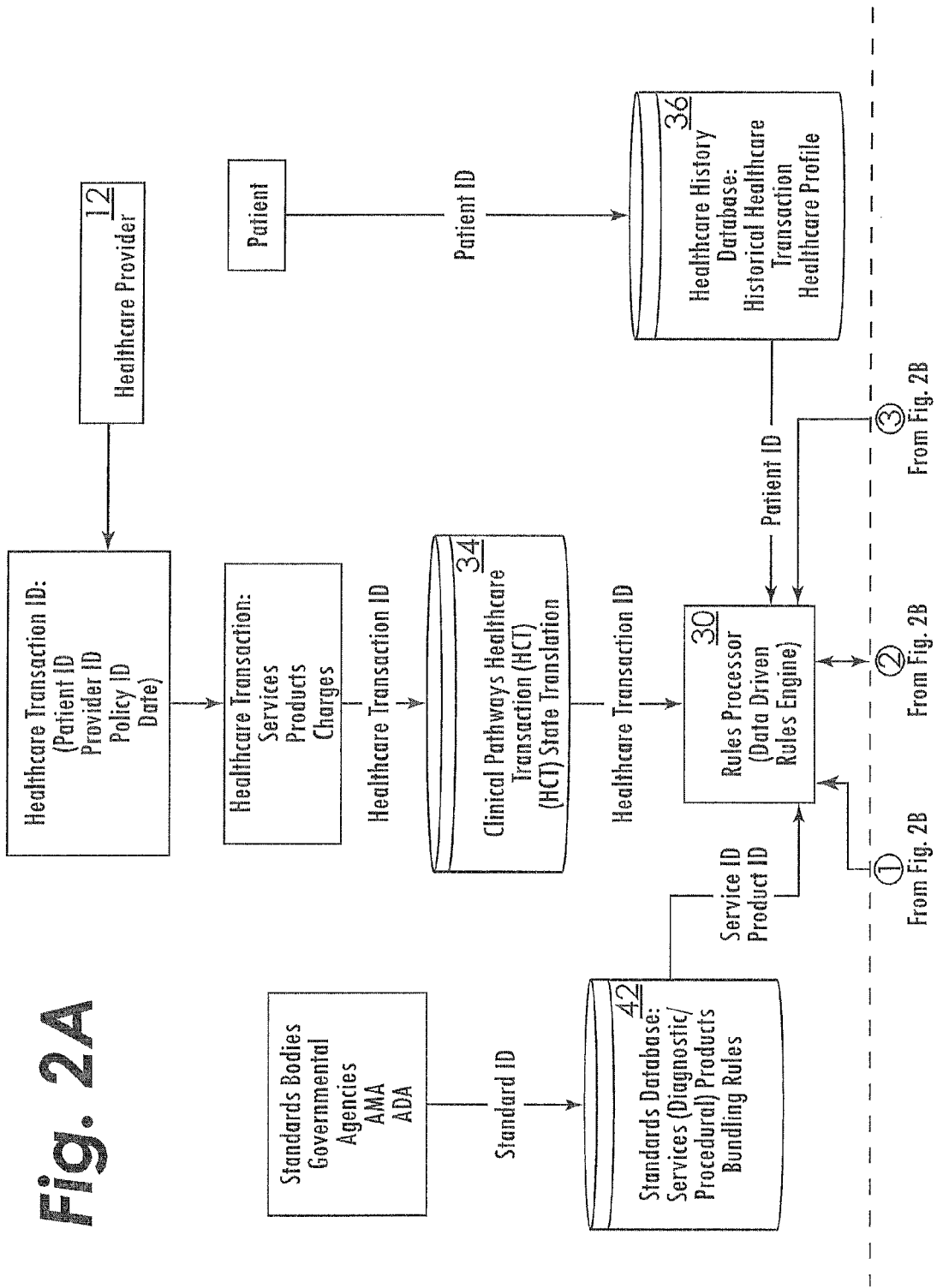
FIGS. 2A-B illustrate a currently preferred embodiment of the adjudication engine in the system of FIG. 1.
Figure 2B:
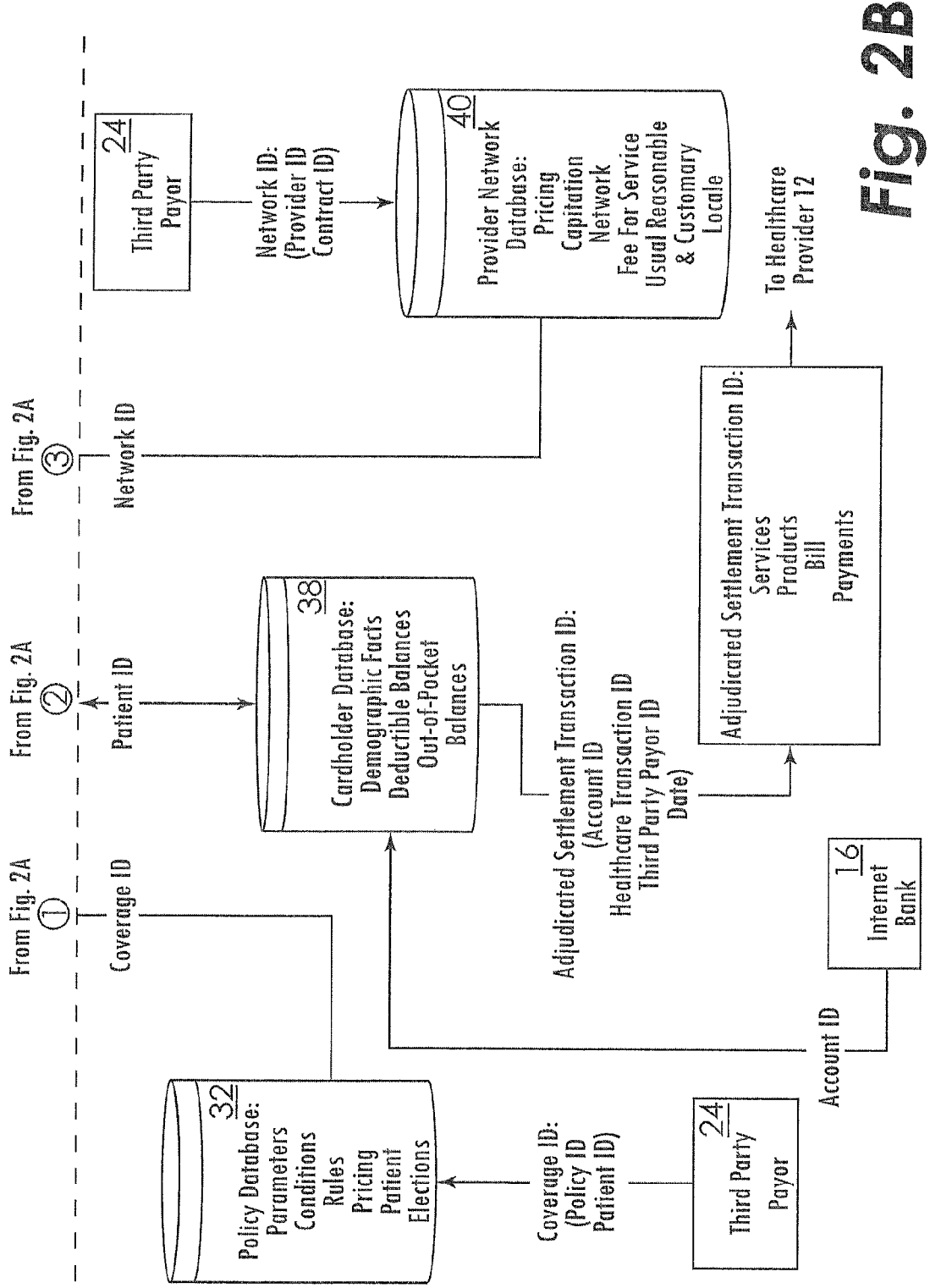

FIGS. 2A-B illustrate a currently preferred embodiment of the adjudication engine 22 utilized in the system of FIG. 1 in the healthcare environment. As shown, at the center of the adjudication engine 22 resides a rules processor 30 whose sole purpose is to adjudicate and price healthcare transactions that are submitted by a healthcare provider 12. The rules processor 30 is a data driven software mechanism that derives rules from the inputted data and executes based on the algorithm or expressions contained within the rules. The order by which these rules are executed is also data driven and is contained within the rules of engagement that are defined in the Policy Database 32 of the third party payor 24. The rules processor 30 performs two primary tasks: the first is to decide whether a healthcare transaction is reimbursable and the second is to price the amount by which the healthcare provider 12 is to be reimbursed based on the healthcare transaction or claim received from the Clinical Pathways Database 34.

To accomplish these tasks the rules processor 30 needs to get information from the following databases:

Policy Database 32—Information pertaining to the patient's coverage is defined in this database. The limits by which the policy operates, such as deductibles, are stored as policy parameters. Preexisting, current, and incident conditions are all stored as conditions. The rules that govern which services and products are covered and in which order are stored as constraints. The methods by which conditions, parameters, and constraints are engaged and adjudicated is stored within policy rules. These policy rules are used by the rules processor 30 to execute algorithms and expressions that act on parameters, constraints and conditions that use data from other databases such as the Clinical Pathway Database 34, Healthcare History Database 36, and Cardholder Database 38. The Policy Database also includes pricing information such as deductible; copay, and coinsurance.

Clinical Pathways Database 34—Information pertaining to the current healthcare transaction (HCT), links to previous HCTs (the clinical pathway), and the state of each HCT as it exists in the pathway, as well as any related healthcare transactions are stored in this database. This information is critical to understanding the order in which services and products were delivered. This data is used by the rules processor 30 to establish whether or not a healthcare transaction should be reimbursed in accordance with the rules of engagement set forth in the Policy Database 32. Pathway information is often critical in determining whether a service or product in the current HCT is valid within the context of the policy.

Healthcare History Database 36—Information pertaining to the patient's healthcare history is stored in this database. This information is captured over time from the patient and includes a collection of atomic healthcare facts about each patient such as the services and products from HCTs, known medical conditions, allergies, and the like. The rules processor 30 uses this data to execute algorithms that pertain to the conditions that exist in the Policy Database 32. In many cases the healthcare history gives overriding information that enables the rules processor 30 to reimburse a healthcare transaction that otherwise would not be reimbursable based on current conditions.

Cardholder Database 38—Information pertaining to the patient and his or her accounts and balances are maintained in this database. The balances are used to identify when the patient or the patient's family has reached their thresholds for products or services as stated by the parameters defined in the Policy Database 32. The patient information contains the demographic facts needed by the rules processor 30 to execute algorithms that pertain to who the patient is and why certain services would or would not be reimbursable (e.g., a male could not have received any services related to giving birth to a child). In other words, demographic facts, account balances, deductible balances, out-of-pocket balances, policy elections, and billing terms for all cardholders and family members can be found in this database.

Provider Network Database 40—Information pertaining to the healthcare provider 12 and what they are to be reimbursed for services and products is primarily stored in this database. The rules processor 30 uses pricing data that specifies Capitation, Fee for Services, usual reasonable and customary (URC) charges by locale and in-network/out-of-network pricing for a healthcare provider 12 to price the healthcare transaction. This lets the healthcare provider 12 know what the third party payor 24 is willing to reimburse for a given patient's healthcare transaction.

Standards Database 42—Information pertaining to the universe of classification standards by which diagnosis and procedural products and services are coded for use in reporting the services and procedures in a healthcare transaction is maintained in this database. These standards are the constraints by which the rules processor 30 can compare and execute rules. These standards also include universal rules for bundling (combining atomic procedures into comprehensive ones). In the healthcare context, the vast majority of healthcare products and services are defined and standardized by three bodies:

1. The U.S. Government sets the International Classification of Disease (ICD) standards by which most healthcare providers 12 classify and report diagnostic information. It also sets the Healthcare Financing Administration (HCFA) Common Procedural Coding System (HCPCS) for classifying and reporting durable medical equipment for Medicare transactions.

2. The American Medical Association sets the Current Procedural Terminology (CPT) standard for classifying and reporting medical procedures. The CPT classification system has a set of rules to determine when sets of individual procedures are to be combined into single more comprehensive ones (bundling).

3. The American Dental Association sets the Current Dental terminology (CDT) standard. This is similar to CPT, but covers the dental procedures which are not covered by CPT.

The rules processor 30 integrated with databases 3242 enables the adjudication engine 22 to receive a healthcare transaction from the healthcare provider 12, to adjudicate and price the healthcare transaction, and to return an Adjudicated Settlement Transaction to the healthcare provider 12. Those skilled in the art will appreciate that the rules processor is a software system that can be written in several programming languages ranging from the expert languages such as LISP, Prologue, and OPS5 to the programming languages of C++, Visual Basic 5.0 and SQL. The key to the rules processor is that the rules are in the data and thus vary in accordance with the data. Also, the rules only need to be interpolated by any of a number of different processors running a rules processor algorithm written in any of these languages.

Figure 3:
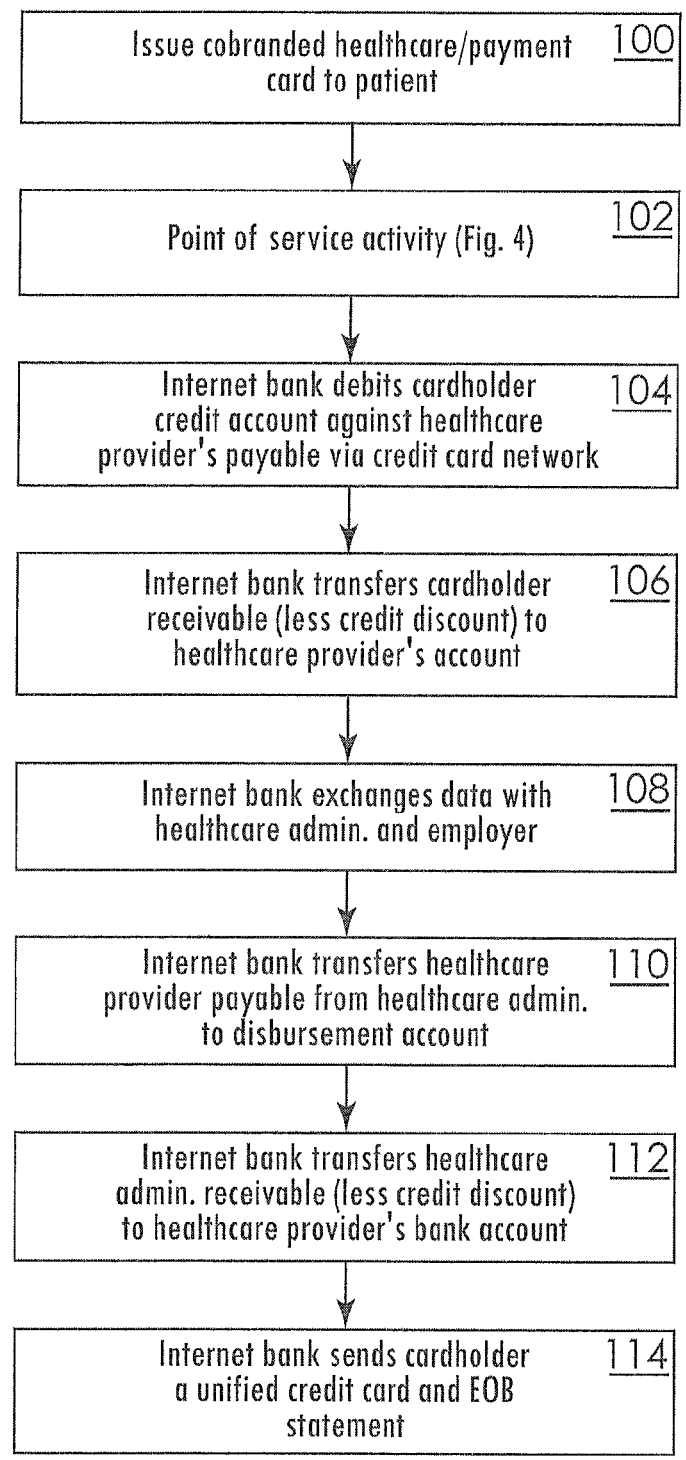
FIG. 3 illustrates a flow diagram of the use of the payment system of the invention for payment of a healthcare provider.
Figure 4:
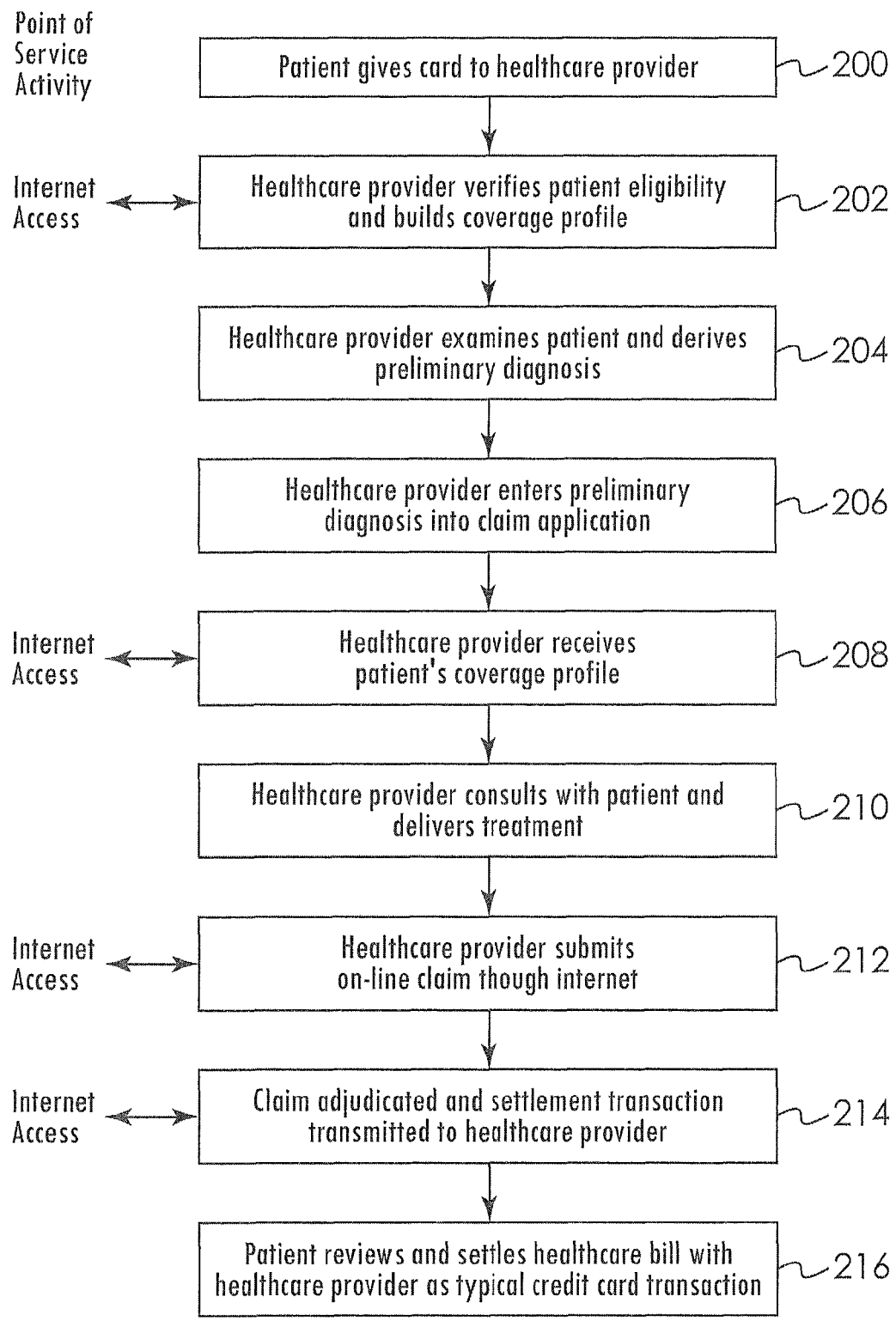
FIG. 4 illustrates a flow diagram of the point of service activity by a healthcare provider when using the payment system of the invention for payment.

FIG. 3 illustrates a flow diagram of the use of the payment system of the invention for payment of a healthcare provider 12. Of course, a similar scheme may be used for processing of other types of transactions besides healthcare transactions.

As illustrated in FIG. 3, the first step in the method of the invention is to issue a cobranded healthcare/payment card to the patient at step 100. As noted above, the cobranded card is preferably issued through the patient's employer in place of the patient's conventional healthcare ID card. If the patient (employee) is not creditworthy, the employer may issue a securitized card that may or may not be cobranded, thereby exempting the employee from participation in the payment system described herein. Also, dependent children under the age of 21 may receive a non-branded card unless the employee requests otherwise. Regardless of branding, all payment cards will provide credit for healthcare transactions in the third party payment system of the invention, while the cobranded cards also may be used as a conventional payment card as well as a mechanism for accessing the third party adjudicated payment system of the invention.

At step 102, the patient, cobranded payment card in hand, purchases a product or service. If the product or service is not eligible for third party payment, the entire payment amount is charged to the customer's payment card account in a conventional manner. However, if the product or service is eligible for third party payment, then the resulting claim or transaction is processed using the adjudicated third party payment system of the invention. An example of point of service activity when the card is used to purchase healthcare goods and services is described below with respect to FIG. 4. As described with respect to FIG. 4, the point of service activity is completed upon settlement of the Adjudicated Settlement Transaction as a typical credit card transaction.

Upon settlement of the Adjudicated Settlement Transaction by the patient (i.e., signature of the credit card receipt for the Adjudicated Settlement Transaction), at step 104 the Internet bank 16 functions as a credit card merchant bank and debits the cardholder's credit account 20 against the healthcare provider's payable via the credit card network 18, of which Internet bank 16 is a part. Assuming that the cardholder (patient) has sufficient credit, Internet bank 16 executes a direct deposit of funds into the healthcare provider's account at step 106, typically the next business day. The amount deposited is the cardholder's receivable (less the merchant bank's credit discount, which is set consistent with that charged to comparable merchants on standard VISA® transactions, for example). In other words, the healthcare provider 12 receives payment of that part of the healthcare transaction for which the patient is responsible (deductibles, copay, coinsurance, etc.). The record of this transaction is preferably available to the healthcare provider.

The Internet bank 16 then exchanges data with the third party payor (healthcare administrator or insurance company) 24 and the patient's employer at step 108 to update the appropriate databases (maintained by the third party payor 24) of the services rendered. All claim information, including the results of adjudication, is preferably sent to the third party payor 24 in a nightly batch. Likewise, all updated eligibility information 26 is preferably submitted from the third party payor 24 to the adjudication engine 22 in batch. In the case of some large employers where there is a second database of record (usually eligibility), there may be an additional exchange of information. The method of information exchange varies by third party payor; the primary protocols include EDI, direct SQL queries and updates, 3270 screen scraping, and FTP.

The Internet bank 16 then transfers the healthcare provider's payable from the third party payor's account 28 to a disbursement account ready for payment at step 110 using an ACH wire transfer, as appropriate. The Internet bank 16 then transfers at step 112 the third party payor's receivable (less a merchant credit discount) from the disbursement account of the *Internet bank 16 using ACH wire transfer for distribution to the healthcare provider's bank account. In other words, the third party payor 24 transfer the portion of the Adjudicated Healthcare Transaction it is obligated to pay to the healthcare provider's account via the Internet bank 16 to complete payment. In accordance with the invention, this entire process may take place substantially instantaneously, although such transactions typically take a couple of days. In any case, the healthcare provider 12 is paid much sooner than in conventional payment systems, and without the administrative overhead typically required. Also, a record of the payment is available to the healthcare provider 12.

Finally, at step 114, the Internet bank 16 sends the cardholder a unified credit card and explanation of benefits (EOB) statement at the end of the current credit cycle. FIGS. 5 and 6 together illustrate a credit card statement (FIGS. 5A-B) and an explanation of benefits (EOB) statement (FIGS. 6A-B) for a cobranded healthcare/credit card account used to access the payment system of the invention. As illustrated, the credit card statement is conventional except that healthcare 'transactions are separated out and explained in an EOB statement for each family member covered by the healthcare policy and credit card. In this fashion, the cardholder obtains a monthly statement which neatly ties medical transactions to their related credit card transactions, thus providing a complete record of services performed which can readily be maintained as a healthcare record for the patient and a record of payment for federal income tax purposes.

Those skilled in the art will appreciate that the payment system and process of the invention introduces a concept to the healthcare industry that exists in just about every other industry: payment in full at the point of service. Because claims are adjudicated in real-time, the healthcare provider and cardholder (patient) both know at the completion of the service or purchase of the product who owes what based on the Adjudicated Settlement Transaction. In other words, a conventional healthcare transaction is broken down into the following:

> Invoiced Amount−Disallowed Amount=Provider Receivable=Patient Payable+Third Party Payor Payable.

The Invoiced Amount is typically the amount desired by the healthcare provider, not the amount expected or allowed. The Disallowed Amount is the difference between the Invoiced Amount what the healthcare provider is contractually permitted to charge for a service, which varies by any combination of healthcare administrator, employer, network, and policy provision. Provider Receivable, on the other hand, is the payment for service a healthcare provider can legally expect after adjudication, while the Patient Payable is the portion of the payable that is assigned to the patient and can be any combination of co-pay, co-insurance, deductible, and uninsured services. Finally, the Third Party Payor Payable is the benefit paid to the healthcare provider on behalf of the patient. The adjudicated third party payment system 10 of the invention permits these variables to be resolved at the point of service rather than weeks later as in the conventional payment systems.

As noted above, FIG. 4 illustrates a flow diagram of the point of service activity by a healthcare provider when using the payment system of the invention for payment of the healthcare provider. As will be apparent to those skilled in the art, this method permits costs to the patient to be considered at the time treatment decisions are made, rather than long after the treatment has been provided.

Step 1: The Cardholder goes to the Healthcare Provider's Office

At step 200, the cardholder or any member of his or her covered family in need of medical assistance goes to the healthcare provider's Office. The visit can be an appointment, a walk-in, or an emergency, but in any case, the cobranded healthcare access card is accepted for payment. The rules of engagement regarding referrals, primary care physicians, and the like vary in accordance with the cardholder's health insurance policy. Prior to visiting the healthcare provider, the cardholder can access the Internet bank's web site to access a member services application which offers options such as selection of primary care physician, provider search, prescription ordering, review of past medical transaction, an on-line policy manual, and the like.

Step 2: First Point of Contact

Upon arrival at the healthcare provider's office, the cardholder presents the cobranded payment system access card. At this point (step 202), the receptionist or other administrator has several options:

1. Accept the card in "default mode," where the payment system access card operates as any other healthcare access card in terms of eligibility verification and selection of the payment vehicle (if the provider accepts VISA®, the co-pay amount could be settled using the payment system access card.)

2. Use the payment system access card to access the Internet bank's web site to verify patient eligibility.

3. Use the payment system access card to verify eligibility and accept the co-pay amount.

4. Use the payment system access card to verify eligibility, accept the co-pay amount and file a claim.

5. In any of these cases, whether in or out of network, both the healthcare provider 12 and the cardholder have several options available to them. For example, a member of the healthcare provider's administrative staff may log onto the Internet bank's web site to verify eligibility. By entering the Internet bank's domain name into an Internet browser or by swiping the cobranded payment system access card through a magstripe reader, the eligibility of the cardholder or any member of the cardholder's immediate family who has been identified as the patient may be determined. If the patient is eligible (insured), the person accessing the web site progresses to the next step in the process. However, if the patient is ineligible (uninsured), the person accessing the web site can inquire about and/or correct any discrepancies (e.g., a new born not yet added to policy, or a new employee with misspelled name, etc.) and then request service once the problem is cleared up. In either case, the patient and the healthcare provider 12 are apprised of the status of eligibility of the patient's healthcare coverage prior to the rendering of services.

Thus, in the broadest sense, step 202 allows the healthcare provider 12 to verify that a policy is in force before services are performed. This step also allows the healthcare provider 12 to determine before services are rendered whether certain services are not covered, have severely limited coverage, require a referring physician, or may only be available within a certain network of healthcare providers. In this manner, the issues which often lead to payment problems can be identified before any services are provided rather than at the time of adjudication, thereby preventing the cardholder from taking on undesired financial liability and the healthcare provider 12 from being exposed to potential financial losses from bad debt. Such comprehensive eligibility checks and preadjudication services allows the healthcare providers and patients to get a thorough understanding of what services are covered, and to what degree, before any financial obligations are generated. Such financial accountability is missing from the current healthcare system in most instances.

Also, preadjudication at step 202 allows the Internet server of the Internet bank 16 to collect the necessary information (e.g., healthcare provider ID to establish effective contract and the Patient ID to establish policy profile) needed to adjudicate the claim. At this point, the initial stage of the claim has been established and the Internet bank 16 may start building a coverage profile while waiting for more information.

Step 3: Healthcare Provider Examines Patient and Derives a Preliminary Diagnosis Based on the patient's input and the healthcare provider's examination at step 204, a preliminary diagnosis can be reached. At this point the healthcare provider 12 has a new option available. Using the adjudicated third party payment system 10 of the invention, the healthcare provider 12 can enter preliminary diagnosis information and receive the patient's coverage profile from the Internet bank's web site. This feature enables both the healthcare provider 12 and the patient to consider options with an understanding of which treatments would be covered by the patient's policy, thereby minimizing financial risk.

Step 4 (Optional): Healthcare Provider Enters Preliminary Diagnosis into Claim Application At step 206, using the healthcare provider's Internet browser (e.g., MS Internet Explorer 4.0, Netscape Navigator 4.0, etc.) the staff member can access the Internet bank's web site and enter the patient's preliminary diagnosis data to begin the claims submission process. This step can be a continuation of the session previously established in step 202 (the verification of patient eligibility) or it can be a new session. In either case, the Internet server of the Internet bank 16 maintains the integrity of the session for the user.

Step 5 (Optional): Based on Preliminary Diagnosis the Patient's Coverage Profile is Returned Once the preliminary diagnosis information has been entered at step 206, the patient's coverage profile may be returned at step 208. The coverage profile identifies which treatments are covered based on the insured's policy as well as all patient medical history that is available. This resource assists the healthcare provider 12 during the consultation with the patient about possible treatments options for the diagnosed medical problem.

This step is optional and is not required for auto-adjudication of the patient's claim. However, it is beneficial for satisfaction of both the healthcare provider's and the patient's concerns about how the payment for services will be managed.

Step 6 (Optional): Healthcare Provider Consults with Patient and Delivers Treatment With the patient's coverage profile in hand, the healthcare provider 12 is able to consult with the patient and determine the type of treatment best suited to the patient's needs both physically and financially at step 210. The result of this provider and patient dialog is the best possible care for the patient. Of course, the healthcare provider 12 and patient may elect to return to the preadjudication interface for additional information as additional treatments are indicated.

This step is also optional, for the healthcare provider 12 is not required to use the patient's coverage profile to determine a course of treatment for the patient or to receive the auto-adjudication benefits. Rather, the emphasis is on maintaining the healthcare provider's autonomy.

Step 7 (Optional): Healthcare Provider's Staff Submits On-Line Claim Through Internet Once treatment has been provided, it is time to pay the bill. The adjudicated third party payment system 10 of the invention enables the healthcare provider 12 to enter a claim and interactively adjudicate that claim on-line using the Internet at step 212. This interactive session aids the user in entering correct data, which facilitates the auto-adjudication process, and therefore, increases the number of claims that may be auto-adjudicated. Of course, a certain percentage of claims will not be able to be auto-adjudicated. For those claims, the healthcare provider 12 may monitor the progress of those claims that must be manually adjudicated.

This step is optional because the healthcare provider 12 can file claims via traditional means and still receive most of the benefits. For example, healthcare providers without Internet access can accept the cobranded payment system access card and use it in its "default mode" to access the credit card payment system via the phone lines.

Generally, there are many conventional ways for the healthcare provider to generate the healthcare transaction or claim for adjudication. The healthcare provider 12 may have practice administration software of the type described in the background of the application which includes claim data entry and submission through a claims processor. Typically, the healthcare provider 12 fills out the claim on a paper form such as the HCFA 1500 and sends it to the administrator's claim center. In accordance with the invention, the claim submission process is corrected by providing live data validation and screening via an Interactive Claim Submission (ICS) interface at the Internet bank's web site. To maintain security, the web site may include a web applet that uses, for example, VISA®'s SET security program. Typically, the healthcare provider 12 will have provided a preadjudicated claim as described above. If so, the preadjudicated claim receives final edits and is submitted by the healthcare provider 12. Alternately, an electronic claim may be started from scratch for submission. In either case, the claim is clean and error free at the time of submission, and accordingly, more likely to be in the proper form for adjudication by the adjudication engine 22. For example, preadjudication identifies improper CPT codes for the patient's policy.

Step 8 (Optional): The Claim is Adjudicated and a Settlement Transaction is Transmitted to the Healthcare Provider At step 214, the claim submitted by the healthcare provider 12 is adjudicated and either a request for more information or an Adjudicated Settlement Transaction in the form of a credit card receipt is transmitted back to the healthcare provider 12. This interactive session enables the healthcare provider's staff to use the adjudication engine 22 to ascertain that the settlement is correct.

The adjudication process includes verifying eligibility, optimizing claim data to minimize financial exposure, verifying policy compliance (e.g., dental is covered), checking timing constraints (e.g., one well care visit per year), determining in-network versus out-of-network status, determining contracted and/or URC fees, determining provider allowed amount, patient responsibility, and the payable third party payor coverage amount. In accordance with the invention, the adjudication engine 22 adjudicates claims substantially in real-time. In many cases, the adjudication is completed within seconds of an Interactive Claim Submission, although, as noted above, the adjudication may be handled in batch form and settlement reached within a day or two.

A simple example of an Adjudicated Settlement Transaction is illustrated in FIG. 7. As illustrated, the Adjudicated Settlement Transaction identifies the amount 44 of the healthcare transaction to be paid by the patient and the amount 46 of the healthcare transaction to be paid by the third party payor 24.

Step 9: Cardholder Reviews and Settles Healthcare Bill

At step 216, the cardholder reviews his or her bill and authorizes how settlement of the charges should be handled. This final step assures the cardholder that no fees can be placed on the credit card without the cardholder's written consent. The cobranded payment system access card then functions just as any other, payment card. However, by using the payment system access card to settle the cardholder's healthcare bill, the cardholder may earn "Deductible Dollars' towards their next healthcare expense and also benefit from the receipt of the comprehensive statements illustrated in FIGS. 5 and 6.

Figure 8A:
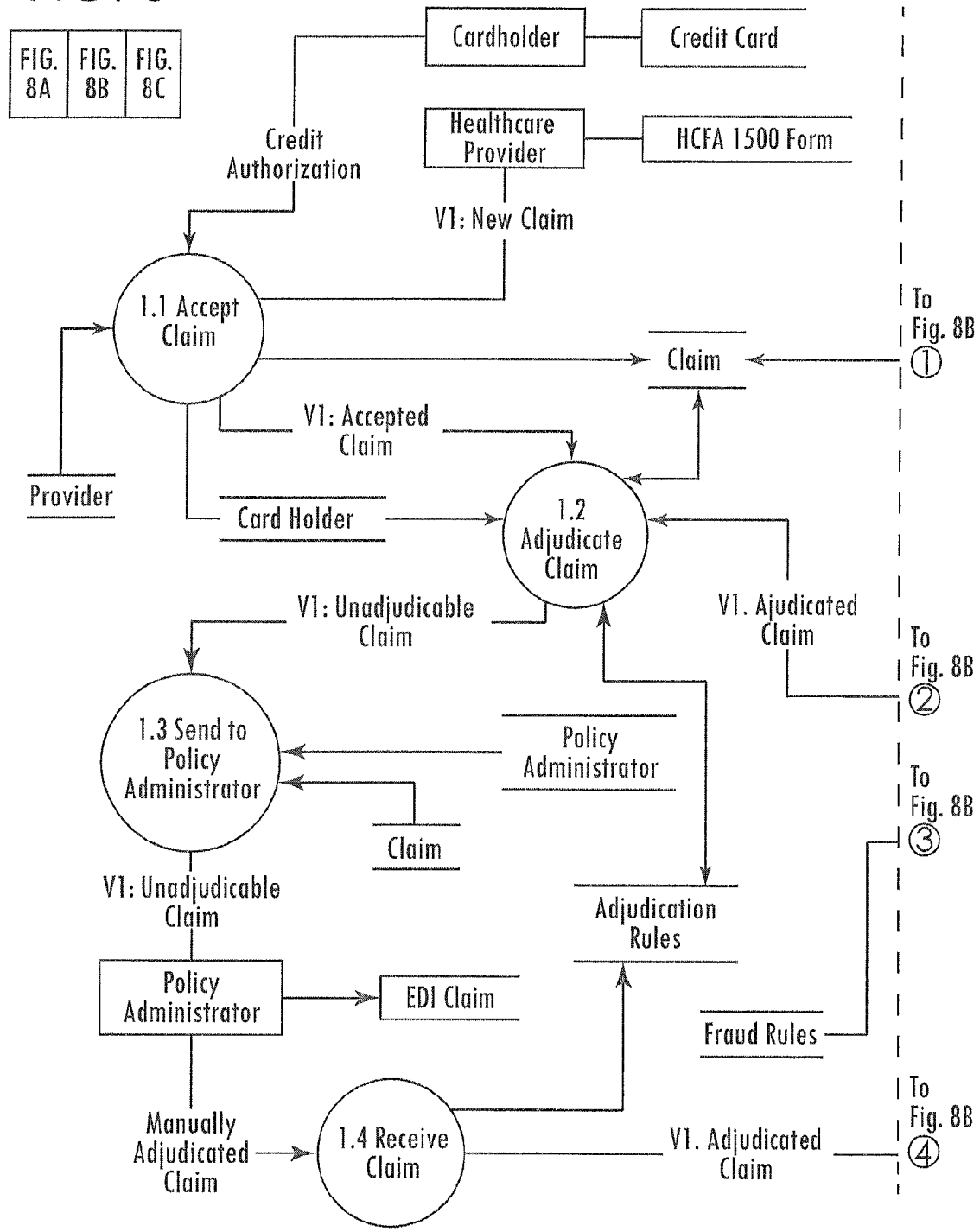
FIGS. 8A-C illustrate the life cycle of a claim submitted by a healthcare provider for processing using the adjudicated third party payment system of the invention.
Figure 8B:
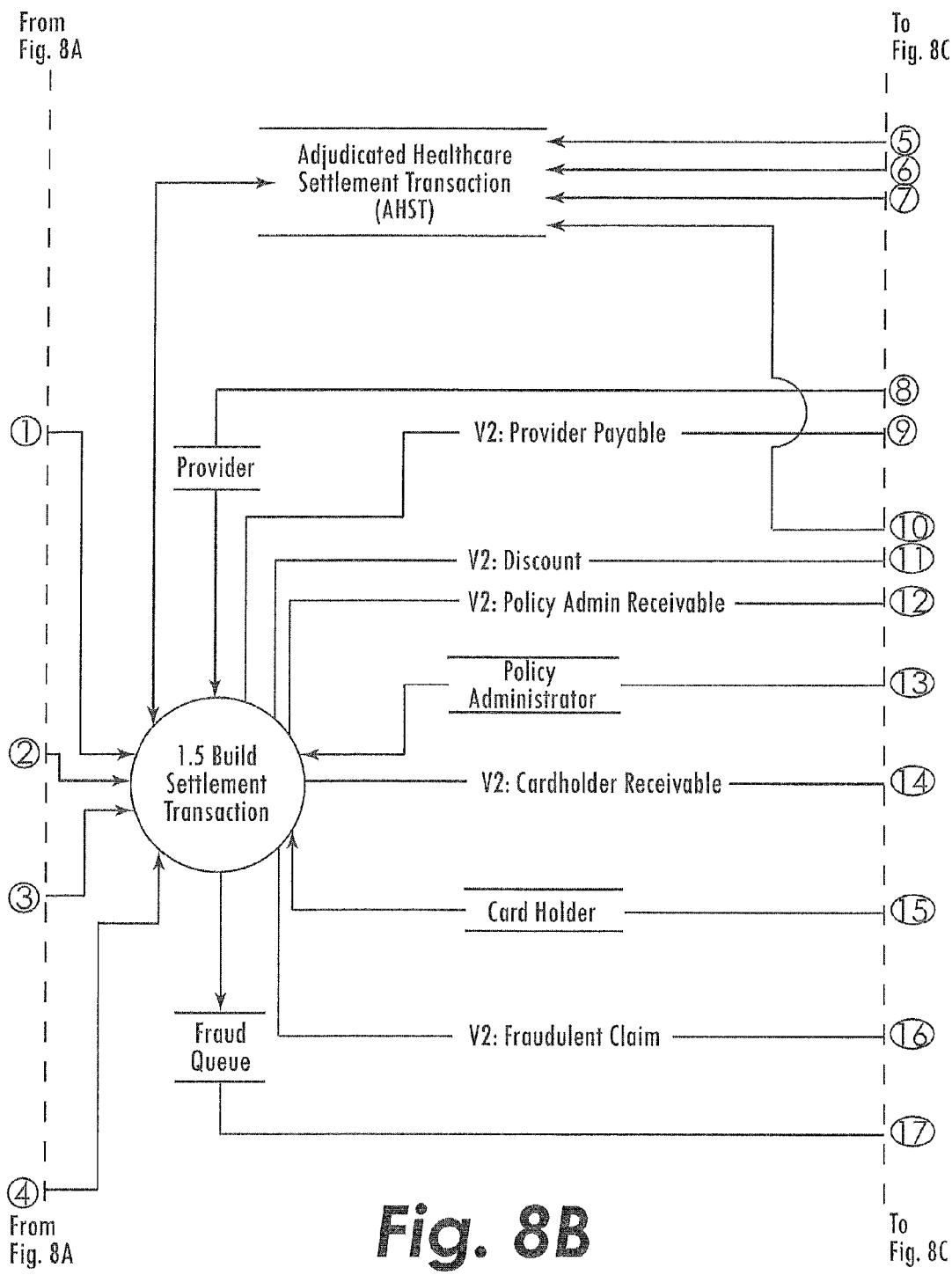
Figure 8C:
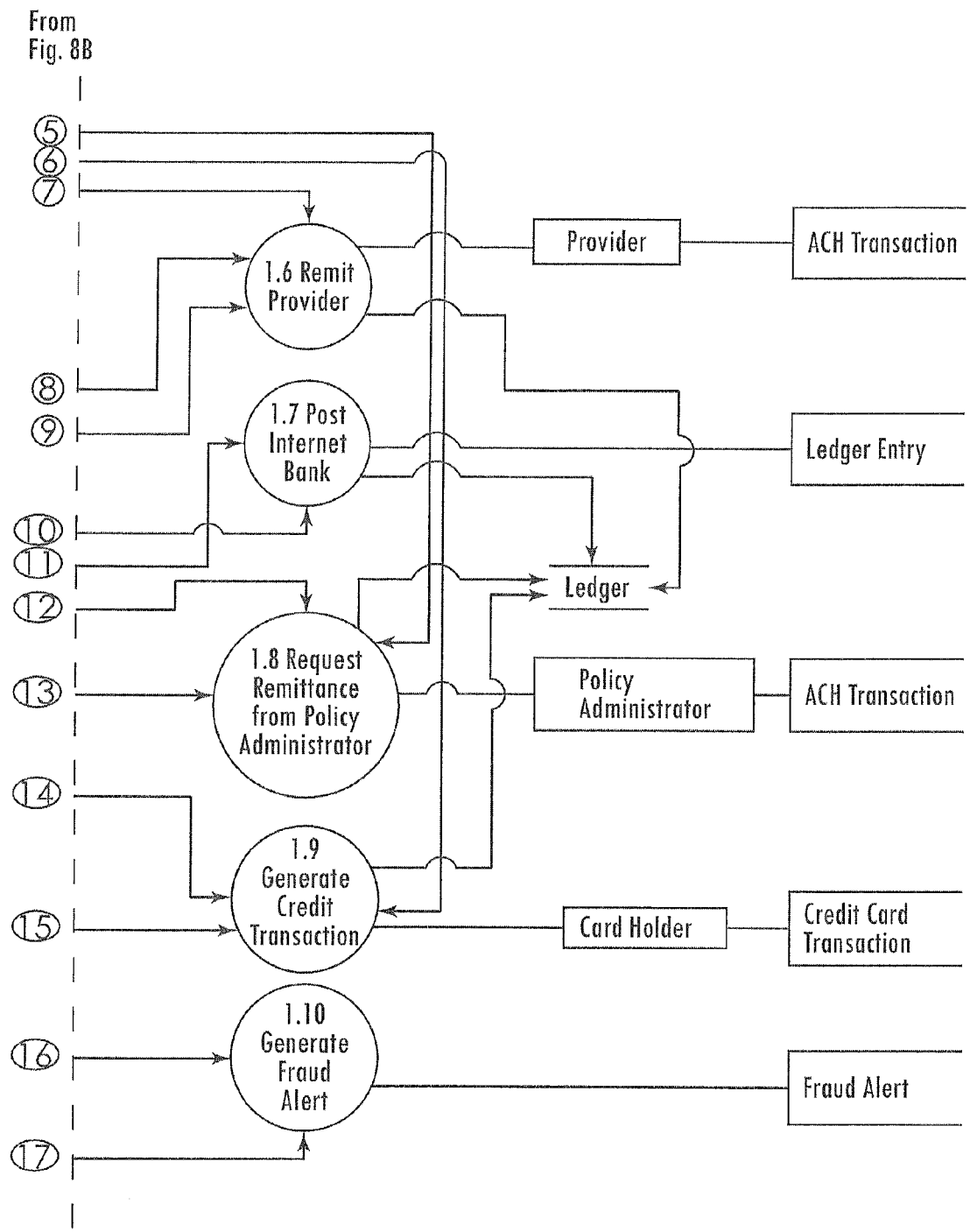

FIGS. 8A-B illustrate the life cycle of a claim submitted by a healthcare provider for processing using the adjudicated third party payment system 10 of the invention. As illustrated, the first step 1.1 is to accept a claim from the healthcare provider 12. Preferably, the claim is generated by completing a HCFA 1500 form and submitting the claim electronically for acceptance or rejection. The healthcare provider 12 may edit the claim to check eligibility, to validate incidents, and to validate the diagnosis. The payment system access card is preferably validated by checking its number and expiration date and is rejected if invalid. The healthcare provider 12 may also be validated by providing an ID and password from the healthcare provider 12 whereby the healthcare provider 12 is rejected if either value is invalid. A mechanism may also be provided for signing up a new healthcare provider 12.

Once a claim is accepted, it is adjudicated at step 1.2. As noted above with respect to FIGS. 2A-B, to adjudicate the claim, the rules processor 30 performs tasks such as checking domain completeness, where the domain includes incident data and diagnosis data, and writing the results to a decision matrix of rules processor 30. The procedures are also checked against the patient's policy coverage parameters. For example, the policy is checked for outright exclusions and temporal constraints, and allowance is made for the framework (toxics, trauma, etc.). In addition, indicators, prior outcomes, and the diagnosis are referenced against the procedures, and the results are again written to the decision matrix of the rules processor 30. Contractual constraints are also evaluated to determine network status (in or out) and referral status (obtained and timely), and the results are written to the decision matrix of the rules processor 30. Adjudication engine 22 also determines pricing by selecting the contract amounts and the URC amounts.

The decision matrix is then evaluated to determine whether the claim is valid or invalid. If the claim is invalid, it is sent to the Policy Administrator for adjudication at step 1.3. On the other hand, if the claim is valid, then the adjudication engine 22 allocates financial responsibility for the claim by determining the amount allowed to the healthcare provider for the claim, determining the amount covered by the Policy Administrator (third party payor), and determining the patient's responsibility by allocating the policy deductible(s), co-pay, co-insurance, and any uncovered amounts. Finally, the Adjudicated Healthcare Settlement Transaction is built at step 1.5 and posted to the settlement queue.

As noted above, any unadjudicable claims are sent to the Policy Administrator for adjudication at step 1.3. The claim is then converted to EDI submission format and transmitted via EDI for manual external adjudication. At step 1.4, the externally adjudicated claim is received as an EDI transmission from the Policy Administrator. The claim is then validated and the results of the adjudication are analyzed to infer any new rules for updating of the adjudication rules. The Adjudicated Healthcare Settlement Transaction is then built at step 1.5 and posted to the settlement queue.

At step 1.5, the Adjudicated Healthcare Settlement Transaction is generated. In this step, the adjudicated claim is identified, and the claim is checked using conventional credit card fraud detection systems to determine if it is fraudulent. If it is determined that the claim is fraudulent, then a Fraud Transaction is generated and the fraud record is posted to a fraud file and a fraud alert is generated at step 1.10 and sent to a fraud unit.

Once the Adjudicated Healthcare Settlement Transaction is generated at step 1.5, the step of remitting the healthcare provider is performed at step 1.6. In particular, the settlement transactions for the healthcare provider are selected and the settlement amounts to payable are summarized. The payable is then posted to ledger, and an EDI record is generated for ACH payment. The EDI record is transmitted to the healthcare provider's bank, and a payment confirmation from the healthcare provider's bank is received. At this time, the payable is closed as well as the settlement transactions. The credit discount record is then posted to the ledger account of the Internet bank 16.

Next, a remittance from the Policy Administrator is requested at step 1.8. In particular, settlement transactions are selected for the Policy Administrator and the transactions are summarized into a receivable record. The receivable record is then posted to the ledger. The receivable is preferably collected from the Policy Administrator using an automated invoice method in which an EDI transaction is generated for ACH payment, an EDI transaction is sent to the Policy Administrator's bank, and payment confirmation is received from the Policy Administrator's bank. On the other hand, a manual invoice method may be used where the invoice is printed and mailed, manual payment is received and posted, and the payment is deposited in the Internet bank 16. Finally, the receivables and the settlement transactions are closed.

The cardholder (patient) is then billed at step 1.9. A cardholder's EOB is created and a credit card statement is generated which integrates the credit card and EOB data into a Healthcare Settlement Statement. The Healthcare Settlement Statement is then mailed and the Healthcare Settlement Statement file is posted to the cardholder's account. The EOB mail date is also provided to the Policy Administrator for its records.

It is contemplated that the payment system access card also may be used to charge the payment (credit) account of the cardholder by the entire amount of the adjudicated settlement amount and later crediting the payment account by remittance from the Policy Administrator rather than completely separating the amounts at the point of service. In this fashion, "Deductible Dollars" may be obtained much faster. Of course, the Policy Administrator's payment portion and the patient's payment portion may be handled completely separately at the point of service, as desired.

Those skilled in the art will appreciate that the system of the invention allows the Internet bank 16 to become the sole source of receivables for the service provider 12. This is a substantial improvement over the present healthcare model where there are thousands of cardholders and dozens of healthcare administrators (third party payors), all of whom can have receivable entries, most of which are not adjudicated for weeks after point of service. Also, the third party adjudicated payment system of the invention allows the Internet bank 16 to become the agent for distributing the cobranded payment cards through employers, adjudicating and paying claims, and disbursing payables. This eliminates three large cost centers: card fulfillment, manual claims adjudication, and accounts payable. The healthcare administrator (third party payor) 24 becomes free to do what is profitable: sell and underwrite insurance policies. In addition, as both the merchant bank and the credit card issuing bank, the Internet bank 16 may reduce the costs of credit.

It will be appreciated by those skilled in the art that even though numerous characteristics and advantages of the present invention have been set forth in the foregoing description, together with details of the structure and function of the invention, the disclosure is illustrative only and numerous alternate embodiments are possible, without departing from the novel teachings of the invention. For example, the adjudication engine of the invention need not be Internet based but may be accessed by a direct dial call via the telephone lines. Also, the payment system access card could be replaced by a smart card, so long as suitable security measures could be incorporated into the smart card. These and other modifications may be made in detail within the principles of the invention to the full extent indicated by the broad general meaning of the terms in which the appended claims are expressed.

We claim:

1. A method of providing adjudicated payment of reimbursable healthcare costs to a healthcare provider at a point of service of a patient, comprising the steps of:
   receiving payment system access information at said point of service for payment for a purchase of at least one of healthcare products and services by the patient, at least part of said purchase being reimbursable by a third party payor;
   transmitting a purchase transaction to an adjudication engine for processing, wherein said purchase is adjudicated substantially in real-time so as to determine a first portion of said purchase to be paid by said third party payor and a second portion of said purchase to be paid by said patient;
   receiving from said adjudication engine an adjudicated settlement transaction at said point of service designating obligations for payment of at least said first portion and said second portion; and
   sending an indication of said completed purchase transaction to initiate a funds transfer in accordance with said obligations for payment of said adjudicated settlement transaction.

2. The method as in claim 1, wherein the step of sending an indication of said completed purchase transaction occurs substantially in real-time during said purchase.

3. The method as in claim 1, wherein said payment system access information includes an account number for a credit card network and a healthcare policy between an employer of the patient and the third party payor, and said sending an indication of said completed purchase transaction step comprises the steps of formatting said adjudicated settlement transaction as a credit card transaction and processing said adjudicated settlement transaction in said credit card network.

4. The method as in claim 1, wherein said payment system access information is provided to the healthcare provider in said providing step prior to provision of healthcare services, said method further comprising the step of:
   accessing said adjudication engine to verify patient eligibility for payment for services by the third party payor prior to provision of healthcare services by the healthcare provider.

5. The method of claim 4, further comprising the step of:
   receiving a coverage profile for the patient by the healthcare provider; and comparing a preliminary diagnosis for healthcare services to be provided to the
patient to said coverage profile prior to providing healthcare services to the patient.

6. The method of claim 1, further comprising the step of:
   receiving an interactive response from said adjudication engine to facilitate said adjudication process.

7. The method of claim 6, further comprising the step of:
receiving an indication of a discrepancy affecting payment for said purchase;
   sending corrected information to facilitate the adjudication process;
   wherein said corrected information is provided prior to completion of said purchase transaction.

8. The method of claim 1, wherein said payment system access information is obtained from a payment system access card.

* * * * *